(12) United States Patent
Gross et al.

(10) Patent No.: US 7,668,696 B2
(45) Date of Patent: *Feb. 23, 2010

(54) METHOD AND APPARATUS FOR MONITORING THE HEALTH OF A COMPUTER SYSTEM

(75) Inventors: Kenny C. Gross, San Diego, CA (US); David McElfresh, San Diego, CA (US); Dan Vacar, San Diego, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 194 days.

This patent is subject to a terminal disclaimer.

(21) Appl. No.: 11/787,719

(22) Filed: Apr. 16, 2007

(65) Prior Publication Data

US 2008/0255807 A1    Oct. 16, 2008

(51) Int. Cl.
*G06F 11/34* (2006.01)
*G21C 17/00* (2006.01)

(52) U.S. Cl. .................. 702/186; 702/185; 714/37; 714/48

(58) Field of Classification Search .............. 702/185, 702/186; 714/37–39, 47, 48
See application file for complete search history.

(56) References Cited

U.S. PATENT DOCUMENTS

| 5,566,092 | A | * | 10/1996 | Wang et al. ................. 702/185 |
| 6,119,111 | A | * | 9/2000 | Gross et al. .................. 706/15 |
| 7,103,460 | B1 | * | 9/2006 | Breed .......................... 701/29 |
| 7,353,431 | B2 | * | 4/2008 | Lopez et al. ................. 714/47 |

OTHER PUBLICATIONS

Kirtley, Jr. et al., 'Monitoring the Health of Power Transformers', 1996, IEEE Computer Applications in Power, pp. 15-23.*

* cited by examiner

*Primary Examiner*—Edward Raymond
*Assistant Examiner*—Elias Desta
(74) *Attorney, Agent, or Firm*—Park, Vaughan & Fleming LLP (57) ABSTRACT

A system that monitors the health of a computer system is presented. During operation, the system receives a first-difference function for the variance of a time series for a monitored telemetry variable within the computer system. The system then determines whether the first-difference function indicates that the computer system is at the onset of degradation. If so, the system performs a remedial action.

19 Claims, 6 Drawing Sheets

METHOD AND APPARATUS FOR MONITORING THE HEALTH OF A COMPUTER SYSTEM

The subject matter of this application is related to the subject matter in a co-pending non-provisional application by Dan Vacar, David K. McElfresh, Kenny C. Gross, and Leoncio D. Lopez entitled, "Characterizing Degradation of Components During Reliability-Evaluation Studies," having serial number 11/452,632, and filing date 13 Jun. 2006

BACKGROUND

1. Field of the Invention

The present invention relates to techniques for monitoring the health of a computer system. More specifically, the present invention relates to a method and apparatus for determining whether a computer system is at the onset of degradation by monitoring a difference function for the variance of a monitored telemetry variable.

2. Related Art

An increasing number of businesses are using computer systems for mission-critical applications. In such applications, a component failure can have a devastating effect on the business. For example, the airline industry is critically dependent on computer systems that manage flight reservations, and would essentially cease to function if these systems failed. Hence, it is critically important to monitor the health of components within the computer system so that remedial actions can be performed on components that are at the onset of degradation.

One technique for monitoring the health of components within the computer system is to monitor telemetry variables generated within the computer system. These telemetry variables can include physical signals generated by transducers: such as temperature, voltage, current, and vibration, and can include software signals monitored by an operating system such as: hard disk activity, central processing unit (CPU) load, and memory usage. Existing health-monitoring techniques detect changes in the mean value of the monitored telemetry variables.

SUMMARY

One embodiment of the present invention provides a system that monitors the health of a computer system. During operation, the system receives a first-difference function for the variance of a time series for a monitored telemetry variable within the computer system. The system then determines whether the first-difference function indicates that the computer system is at the onset of degradation. If so, the system performs a remedial action.

In one embodiment, prior to receiving the first-difference function, the system receives the variance of the time series for the monitored telemetry variable. Next, the system calculates a residual function of the variance of the time series for the monitored telemetry variable. The system then calculates the first-difference function from the residual function of the variance.

In one embodiment, prior to receiving the variance for the time series for the monitored telemetry variable, the system receives the time series for the monitored telemetry variable. The system then calculates the variance of the time series for the monitored telemetry variable.

In one embodiment, while calculating the first-difference function of the time series, for each time point within the time series, the system subtracts a value of the time series at a previous time point from the value of the time series at a present time point.

In one embodiment, the system divides the result of the subtraction by the value of a length of a time interval between the previous time point and the present time point.

In one embodiment, while calculating the residual function for a time series, for each time interval in the time series, the system (1) calculates a running average of values for the time series up to and including a present time interval; and (2) subtracts the running average from a value of the time series at the present time interval.

In one embodiment, while determining whether the first-difference function indicates that the computer system is at the onset of degradation, the system determines whether the first-difference function exceeds a specified threshold.

In one embodiment, while determining whether the first-difference function indicates that the computer system is at the onset of degradation, the system performs a Sequential Probability Ratio Test (SPRT) on the first-difference function. The system then determines whether the SPRT generates an alarm.

In one embodiment, the SPRT can include one or more of: a positive variance first-difference test, which generates an alarm if the first-difference function for the variance of the time series for the monitored telemetry variable is increasing; and a negative variance first-difference test, which generates an alarm if the first-difference function for the variance of the time series for the monitored telemetry variable is decreasing.

In one embodiment, while performing the remedial action the system performs one or more of the following actions: recording a time when the onset of degradation occurred; notifying a system administrator that the computer system is at the onset of degradation; shutting down the computer system; backing up data stored on the computer system; failing-over to a redundant computer system; replacing one or more components which are at the onset of degradation; and performing other remedial actions.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. This includes, but is not limited to, volatile memory, non-volatile memory, magnetic and optical storage devices such as disk drives, magnetic tape, CDs (compact discs), DVDs (digital versatile discs or digital video discs), or other media capable of storing computer readable media now known or later developed.

Overview

One embodiment of the present invention detects precursor failure mechanisms that do not show up as anomalies in the mean value or in the correlation patterns for telemetry variables. More specifically, one embodiment of the present invention detects failure mechanisms that appear as changes in the variance (including the degree of spikiness or burstiness) of monitored telemetry variables.

One embodiment of the present invention proactively detects and monitors the evolution of computer system failure mechanisms through a binary-hypothesis test that continuously monitors the digitized rate-of-change of the variance for monitored telemetry variables. In doing so, the present invention can detect anomalies that show up as a change-in-gain, change-in-variance, or change-in-spikiness/burstiness, without a change-in-mean value.

One embodiment of the present invention detects increases in the variance of a monitored telemetry variable and quantifies the rate of increase in the variance. Another embodiment of the present invention detects decreases in the variance of a monitored telemetry variable and quantifies the rate of decrease in the variance. Note that decreases in variance include the case where physical transducers degrade with what are known as "stuck-at" failures.

Note that for the sake of clarity, the present invention is described in terms of "telemetry variables," which can generally include, but are not limited to, sensor signals generated by physical sensors or software sensors, instrumentation signals, inferential variables which are inferred from sensor signals or inferred from other variables or signals, and any other variable or signal that can be used to determine the health of a computer system or a component.

Computer System

Figure 1:
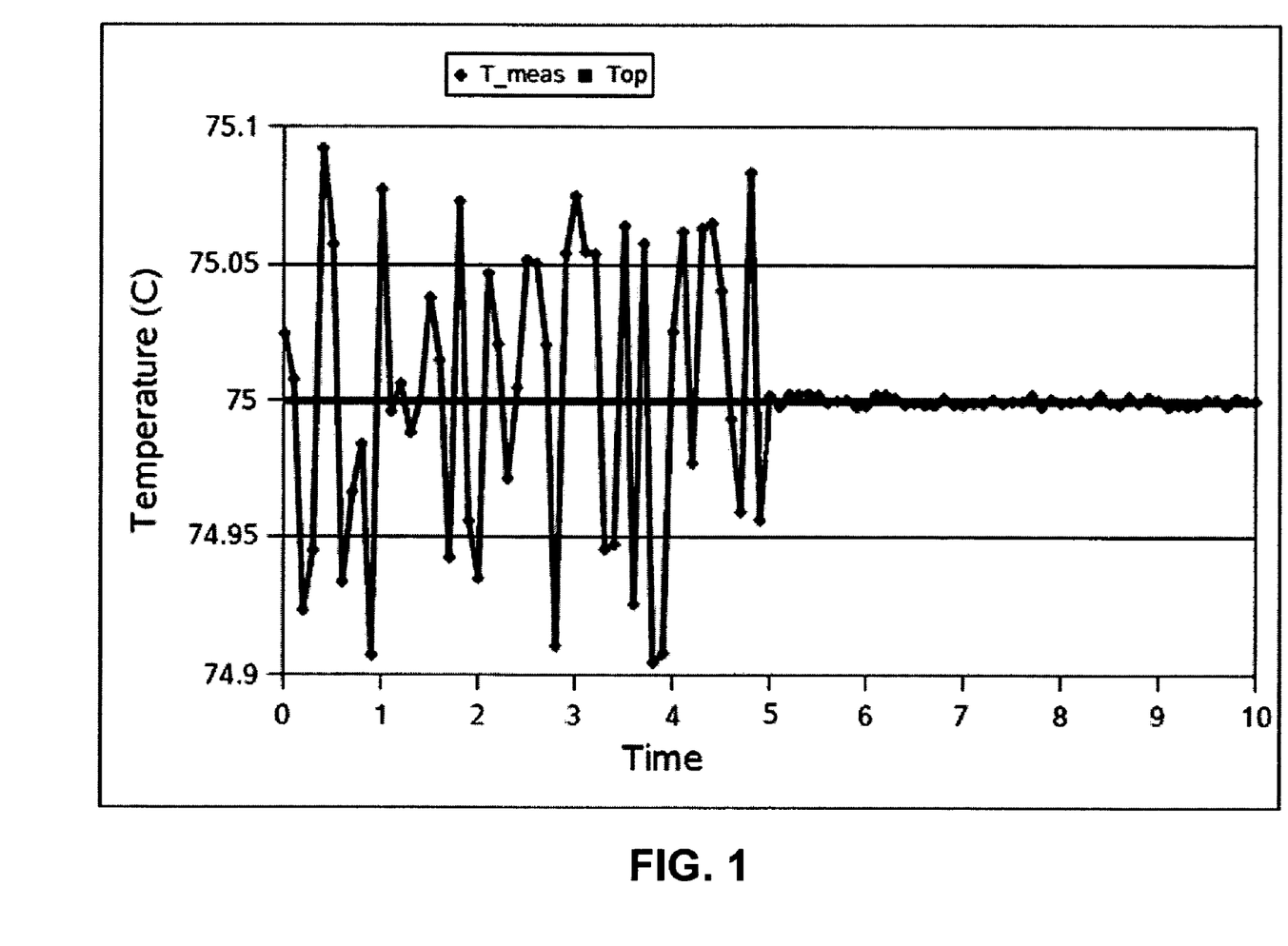
FIG. 1 presents a plot illustrating the output of a failing temperature sensor.
Figure 2:
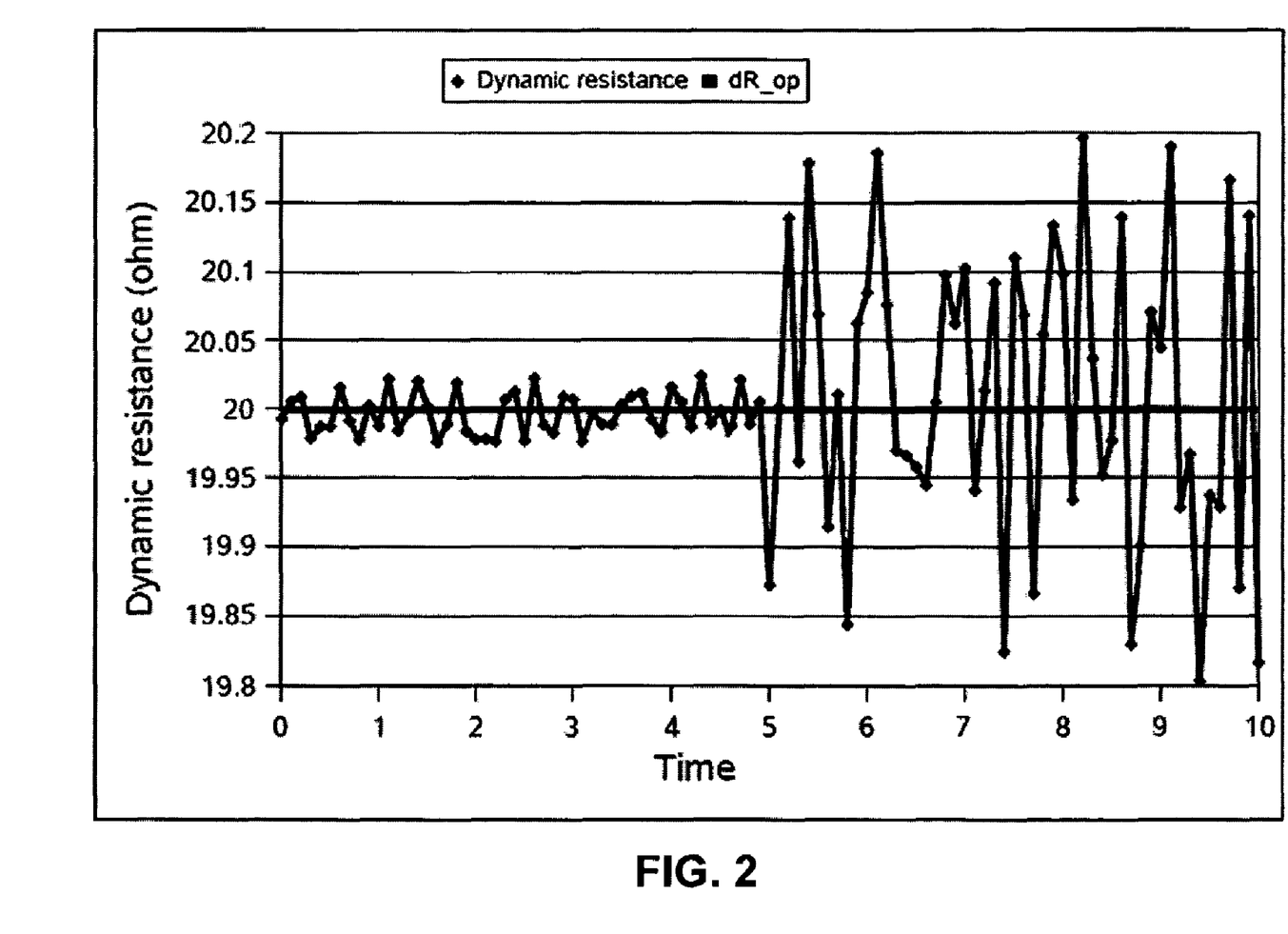
FIG. 2 presents a plot illustrating the dynamic resistance of a failing interconnect.
Figure 3:
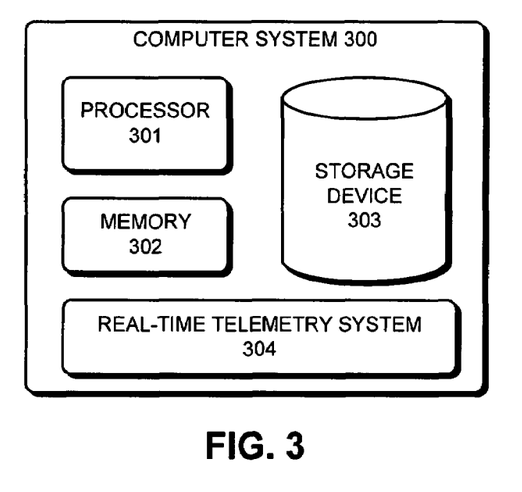
FIG. 3 presents a block diagram illustrating a computer system in accordance with an embodiment of the present invention.

FIG. 3 presents a block diagram illustrating a computer system 300 in accordance with an embodiment of the present invention. Computer system 300 includes processor 301, memory 302, storage device 303, and real-time telemetry system 304.

Processor 301 can generally include any type of processor, including, but not limited to, a microprocessor, a mainframe computer, a digital signal processor, a personal organizer, a device controller and a computational engine within an appliance. Memory 302 can include any type of memory, including but not limited to, dynamic random access memory (DRAM), static random access memory (SRAM), flash memory, read only memory (ROM), and any other type of memory now known or later developed. Storage device 303 can include any type of non-volatile storage device that can be coupled to a computer system. This includes, but is not limited to, magnetic, optical, and magneto-optical storage devices, as well as storage devices based on flash memory and/or battery-backed up memory.

In one embodiment of the present invention, real-time telemetry system 304 is separate from computer system 300. Note that real-time telemetry system 304 is described in more detail below with reference to FIG. 4.

Real-Time Telemetry System

Figure 4:
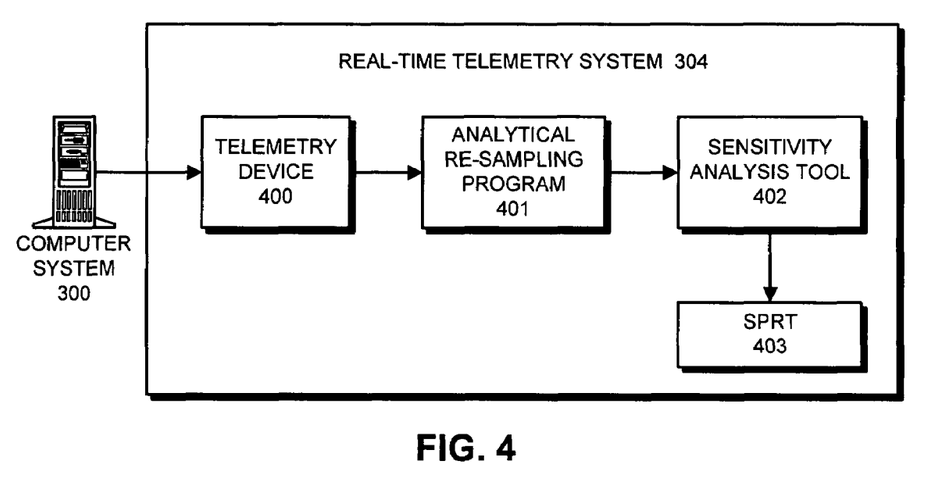
FIG. 4 illustrates real-time telemetry system in accordance with an embodiment of the present invention

FIG. 4 illustrates real-time telemetry system 304 in accordance with an embodiment of the present invention. Referring to FIG. 4, computer system 300 can generally include any computational device including a mechanism for servicing requests from a client for computational and/or data storage resources. In one embodiment, computer system 300 is a high-end uniprocessor or multiprocessor server that is being monitored by real-time telemetry system 304.

Real-time telemetry system 304 includes telemetry device 400, analytical re-sampling program 401, sensitivity analysis tool 402, and SPRT module 403. Telemetry device 400 gathers information from the various sensors and monitoring tools within computer system 300. In one embodiment, telemetry device 400 directs the signals to a remote location that contains analytical re-sampling program 401, sensitivity analysis tool 402, and SPRT module 403. In another embodiment of the present invention, one or more of analytical re-sampling program 401, sensitivity analysis tool 402, and SPRT module 403 are located within computer system 300.

Analytical re-sampling program 401 ensures that the monitored telemetry variables have a uniform sampling rate. In doing so, analytical re-sampling program 401 uses interpolation techniques, if necessary, to fill in missing data points, or to equalize the sampling intervals when the raw data is non-uniformly sampled.

After the telemetry variables pass through analytical re-sampling program 401, they are aligned and correlated by sensitivity analysis tool 402. For example, in one embodiment of the present invention sensitivity analysis tool 402 incorporates a novel moving window technique that "slides" through the telemetry variables with systematically varying window widths. The system systematically varies the alignment between sliding windows for different telemetry variables to optimize the degree of association between the telemetry variables, as quantified by an "F-statistic," which is computed and ranked for all telemetry variable windows by sensitivity analysis tool 402.

While statistically comparing the quality of two fits, F-statistics reveal the measure of regression. The higher the value of the F-statistic, the better the correlation is between two telemetry variables. The lead/lag value for the sliding window that results in the F-statistic with the highest value is chosen, and the candidate telemetry variable is aligned to maximize this value. This process is repeated for each telemetry variable by sensitivity analysis tool 402.

Telemetry variables that have an F-statistic very close to 1 are "completely correlated" and can be discarded. This can result when two telemetry variables are measuring the same metric, but are expressing them in different engineering units. For example, a telemetry variable can convey a temperature in degrees Fahrenheit, while a second telemetry variable conveys the same temperature in degrees Centigrade. Since these two telemetry variables are perfectly correlated, one does not contain any additional information over the other, and therefore, one may be discarded.

Some telemetry variables may exhibit little correlation, or no correlation whatsoever. In this case, these telemetry variables may be dropped because they add little predictive information. Once a highly correlated subset of the telemetry variables has been determined, they are combined into one group or cluster for processing by the SPRT module 403.

One embodiment of the present invention continuously monitors a variety of telemetry variables (e.g., sensor signals) in real time during operation of the server. (Note that although we refer to a single computer system in this disclosure, the present invention can also apply to a collection of computer systems).

These telemetry variables can also include signals associated with internal performance parameters maintained by software within the computer system. For example, these internal performance parameters can include, but are not limited to, system throughput, transaction latencies, queue lengths, central processing unit (CPU) utilization, load on CPU, idle time, memory utilization, load on the memory, load on the cache, I/O traffic, bus saturation metrics, FIFO overflow statistics, and various operational profiles gathered through "virtual sensors" located within the operating system.

These telemetry variables can also include signals associated with canary performance parameters for synthetic user transactions, which are periodically generated for the purpose of measuring quality of service from the end user's perspective.

These telemetry variables can additionally include hardware variables, including, but not limited to, internal temperatures, voltages, currents, and fan speeds.

Furthermore, these telemetry variables can include disk-related metrics for a remote storage device, including, but not limited to, average service time, average response time, number of kilobytes (kB) read per second, number of kB written per second, number of read requests per second, number of write requests per second, and number of soft errors per second.

In one embodiment of the present invention, the foregoing telemetry variables are monitored continuously with one or more SPRT tests.

In one embodiment of the present invention, the components from which the telemetry variables originate are field replaceable units (FRUs), which can be independently monitored. Note that all major system components, including both hardware and software components, can be decomposed into FRUs. (For example, a software FRU can include: an operating system, a middleware component, a database, or an application.)

Also note that the present invention is not meant to be limited to server computer systems. In general, the present invention can be applied to any type of computer system. This includes, but is not limited to, a computer system based on a microprocessor, a mainframe computer, a digital signal processor, a portable computing device, a personal organizer, a device controller, and a computational engine within an appliance.

Detecting Changes in Variance

One embodiment of the present invention computes the first-difference function of the variance estimates for digitized time-series telemetry variables under surveillance. In one embodiment of the present invention, the time-series signals are "residuals" formed by subtracting the mean value of a monitored telemetry variable from the value of the monitored telemetry variable. Note that the first-difference function of the variance is a numerical approximation of the derivative of the sequence of variance estimates.

In one embodiment of the present invention, a sequential probability ratio test (SPRT) is used to monitor first-difference function of the variance of a telemetry variable. In one embodiment, the SPRT generates a warning flag if the variance of the telemetry variable is increasing (positive variance first-difference function SPRT). In another embodiment, the SPRT generates a warning flag if the variance of the telemetry variable is decreasing (negative variance first-difference function SPRT). Note that more than one SPRT test can be used at the same time.

A comparison of SPRT alarms issuing from a positive variance-derivative SPRT and/or a negative variance first-difference function SPRT provides a wealth of diagnostic information on a class of failure modes known collectively as a "change-in-gain without a change-in-mean". For example, if the positive variance-derivative SPRT triggers warning flags, it is an indication that there has been a sudden increase in the variance (or degree of spikiness or burstiness) of the process. If this SPRT subsequently ceases triggering warning flags, it is an indication that the degradation mode responsible for the increased noisiness has gone to completion. Such information can be beneficial in root causing the origin of the degradation and helping to eliminate the degradation mechanism from future product designs.

Similarly, if the negative variance first-difference function SPRT starts triggering alarms, there is a decrease in variance for the process. If the negative variance first-difference function SPRT ceases issuing warning flags, it is an indication that the degradation mode has gone to completion. In safety critical processes, this failure mode (decreasing variance without a change in mean) is dangerous in conventional systems that are monitored only by threshold limit tests. The reason it is dangerous is that a shrinking variance, when it occurs as a result of a transducer that is losing its ability to respond, never trips a threshold limit. (Whereas degradation that manifests as a linear decalibration bias, or even an increasing variance, will eventually trip a high or low threshold limit and sound a warning). A sustained shrinking variance, which can occur, for example, when oil-filled pressure transmitters leak their oil, or electrolytic capacitors leak their electrolyte, never trips a threshold, but can be detected by the positive and negative variance first-difference function SPRT tests.

Figure 5:
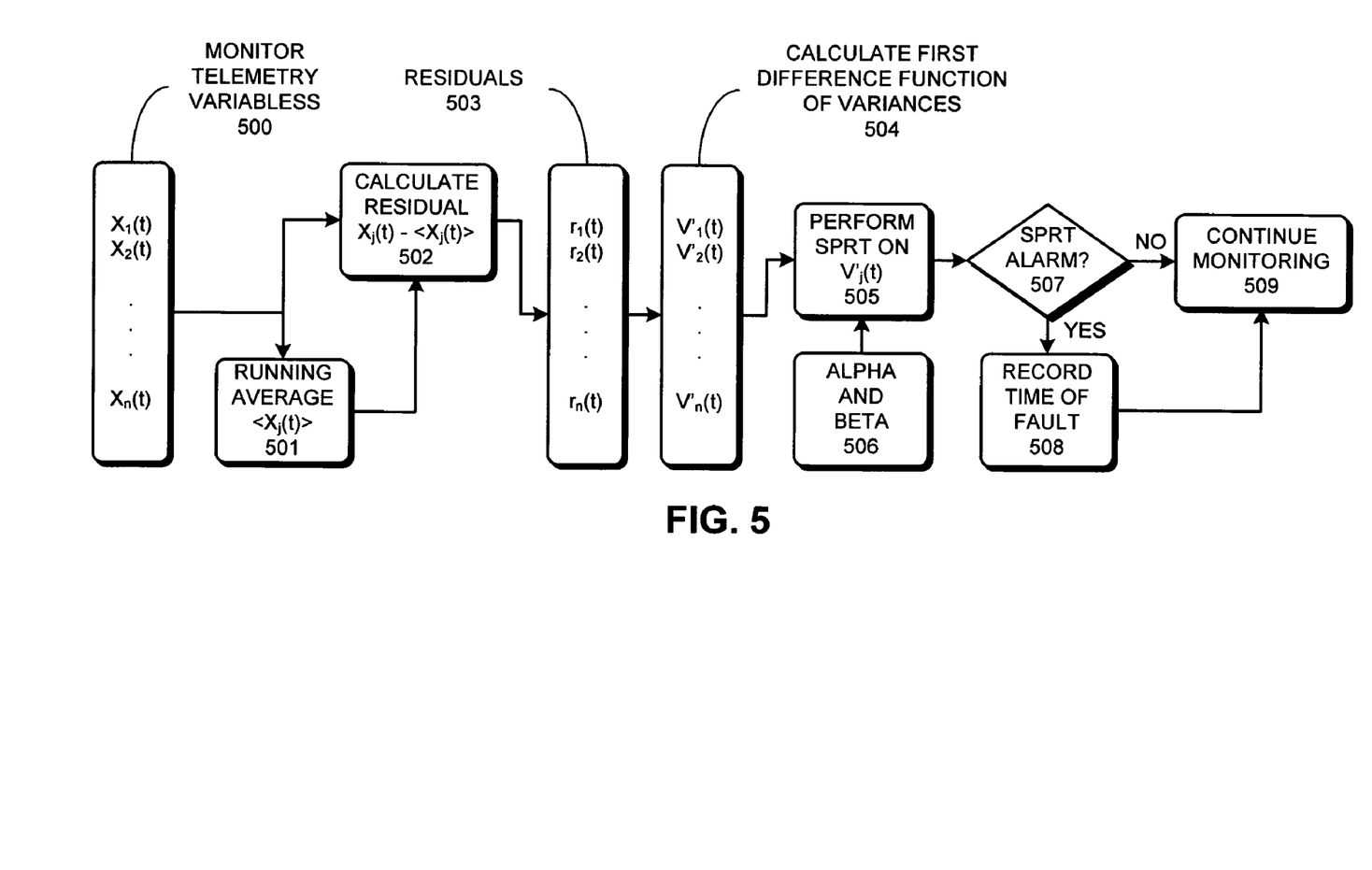
FIG. 5 presents a flow chart illustrating the process of using the first-difference function for the variance of telemetry variables to monitor the health of a computer system in accordance with an embodiment of the present invention.

FIG. 5 presents a flow chart illustrating the process of using the first-difference function for the variance of telemetry variables to monitor the health of a computer system in accordance with an embodiment of the present invention. The process begins when the system monitors telemetry variables (step 500). In one embodiment of the present invention, the telemetry variable is a variance function of the monitored telemetry variable. In another embodiment of the present invention, the system receives a time series for the monitored telemetry variable and calculates a variance function of the time series for the monitored telemetry variable.

Next, the system calculates a running average for each monitored telemetry variable (step 501). The system then calculates residuals for the telemetry variables (step 502) to produce residuals 503. In one embodiment of the present invention, the system calculates residuals for the telemetry variables by subtracting the running average for each monitored telemetry variable from the corresponding monitored telemetry variable.

Next, the system calculates the first-difference function for the residuals of the variance for the monitored telemetry variables (step 504). In one embodiment of the of the present invention, for each time point within the time series for the telemetry variable, the system calculates the first-difference function by subtracting a value of the time series at a previous time point from the value of the time series at a present time point. In one embodiment of the present invention, the system divides the result of the subtraction by the value of a length of a time interval between the previous time point and the present time point.

The system then performs a Sequential Probability Ratio Test (SPRT) on the first-difference functions (step 505). Note that the system also receives alpha and beta values 506 for the SPRT. (SPRTs are described in more detail below.)

If an alarm is generated by the SPRTs (step 507, yes), the system records the time of failure (step 508), and continues monitoring the telemetry variables (step 509). If no alarm is generated by the SPRTs (step 507, no), the system continues monitoring the telemetry variables (step 509).

In one embodiment of the present invention, a remedial action is also performed in step 508. In one embodiment of the present invention, the remedial action can involve performing one or more of: recording a time when the onset of degradation occurred; notifying a system administrator that the computer system is at the onset of degradation; shutting down the computer system; backing up data stored on the computer system; failing-over to a redundant computer system; replacing one or more components which are at the onset of degradation; and other remedial actions.

Accelerated-Life Studies

For devices undergoing accelerated-life studies, it is often desirable to supply power to the devices under test while they are in the stress-test chambers. Even though it may not be possible to apply the full pass/fail functional testing to the devices inside the stress-test chamber, a change in the electrical behavior of the device can be detected by monitoring the signatures of the electrical current being applied to the devices. Note that subtle anomalies in the noise-signature time-series of the current for the device appear when the device degrades and/or fails. Also note that the current to the device can provide an indirect measure of the health of a device. More specifically, the current-noise time series can be used as an "inferential variable" for high-resolution annunciation of the onset of degradation and, in many cases, the exact point of failure in time in the components undergoing accelerated-life studies.

Figure 6:
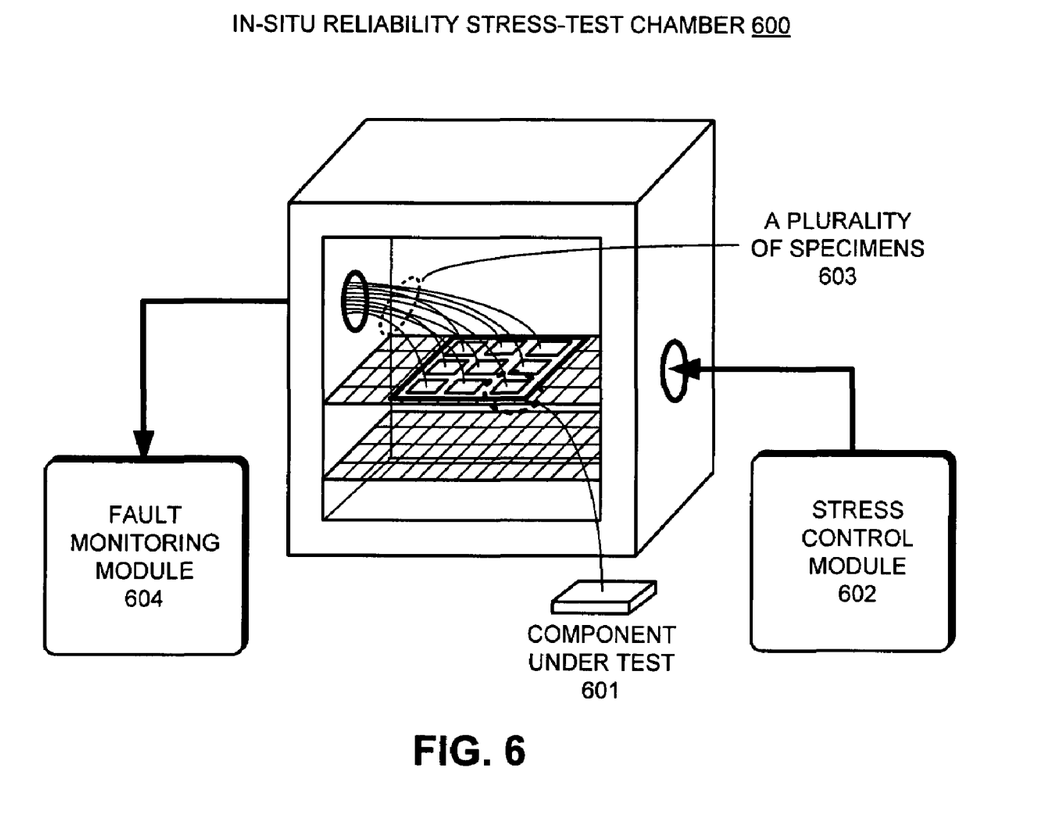
FIG. 6 illustrates an in-situ reliability stress-test chamber in accordance with an embodiment of the present invention.

FIG. 6 illustrates an in-situ reliability stress-test chamber 600 in accordance with an embodiment of the present invention. A component under test 601, which can be any type of device from a computer system, is placed inside stress-test chamber 600. Note that component under test 601 can include, but is not limited to: power supplies, capacitors, sockets, integrated circuit chips, hard drives, and transceivers.

Stress control module 602 applies and controls one or more stress variables to the stress-test chamber 600. These stress variables can include, but are not limited to: temperature, humidity, vibration, voltage, chemical/environmental, and radiation. In one embodiment of the present invention, stress control module 602 applies sufficient stress factors to stress-test chamber 600 to create accelerated-life studies for the component under test 601. The same setup can also be applied to early failure rate studies of a component, burn-in screens of a component and repair-center reliability evaluations of a returned component.

As is shown in FIG. 6, stress-test chamber 600 can contain multiple units (specimens) of component under test 601, wherein an array of nine specimens 603 of component under test 601 are shown. Stress-test chamber 600 provides a supply of power to each specimen of component under test 601, and obtains telemetry variable outputs (e.g., inferential variables) from each specimen. The telemetry variable outputs are coupled to a fault-monitoring module 604. In one embodiment of the present invention, fault-monitoring module 604 is a Continuous System Telemetry Harness (CSTH).

Note that the output data series can be either processed in real-time or post-processed. In one embodiment of the present invention, fault-monitoring module 604 analyzes the output data series in real-time while the telemetry variables are being collected from all of the specimens 603 of component under test 601, and predicts the likelihood of failure for each of specimens 603. In another embodiment of the present invention, fault-monitoring module 604 post-processes the output data series at a later time and detects whether failures have occurred at an earlier time, and if so, determines the time of failures. Note that the output data series can include but is not limited to: a time-series, a number of cycles, and a number of incidents.

Furthermore, note that the telemetry variable from each specimen of the component can include current, voltage, resistance, temperature, and other physical variables. Also, note that all of the specimens 603 in stress-test chamber 600 can be tested at the same time and under the same conditions. Moreover, instead of testing multiple individual components, the stress-test chamber can be configured to test a single component.

One embodiment of the present invention uses an ultra-sensitive sequential detection technique called the Sequential Probability Ratio Test (SPRT) for telemetry variable surveillance to accurately identify the onset of component degradation and/or failure. Moreover, a tandem SPRT can be run on the derivative of the telemetry variable's time series to accurately assess the time of complete of failure. The combination of tandem SPRTs that monitor the telemetry variables provides a robust surveillance scheme which has the capability to:

1. detect the onset of degradation in any individual component under stress, even when the overall functionality of that component cannot be measured directly; and to
2. detect the time of complete failure for any component under stress.

In one embodiment of the present invention, information from the tandem SPRT analyses is combined with discrete-time ex-situ pass/fail testing to construct a detailed population failure distribution.

One embodiment of the present invention lessens the constraints on the tradeoff between the number of units under test and the duration of the experiments, while yielding much higher resolution information on the dynamic evolution of the health of the components as a function of age and cumulative stress. This higher resolution facilitates higher confidence in selecting a mathematical model that accurately predicts the long-term reliability of the component for a time point beyond the number of hours the component was actually tested.

Also note that the present invention minimizes expensive ex-situ functional evaluations.

Figure 7:
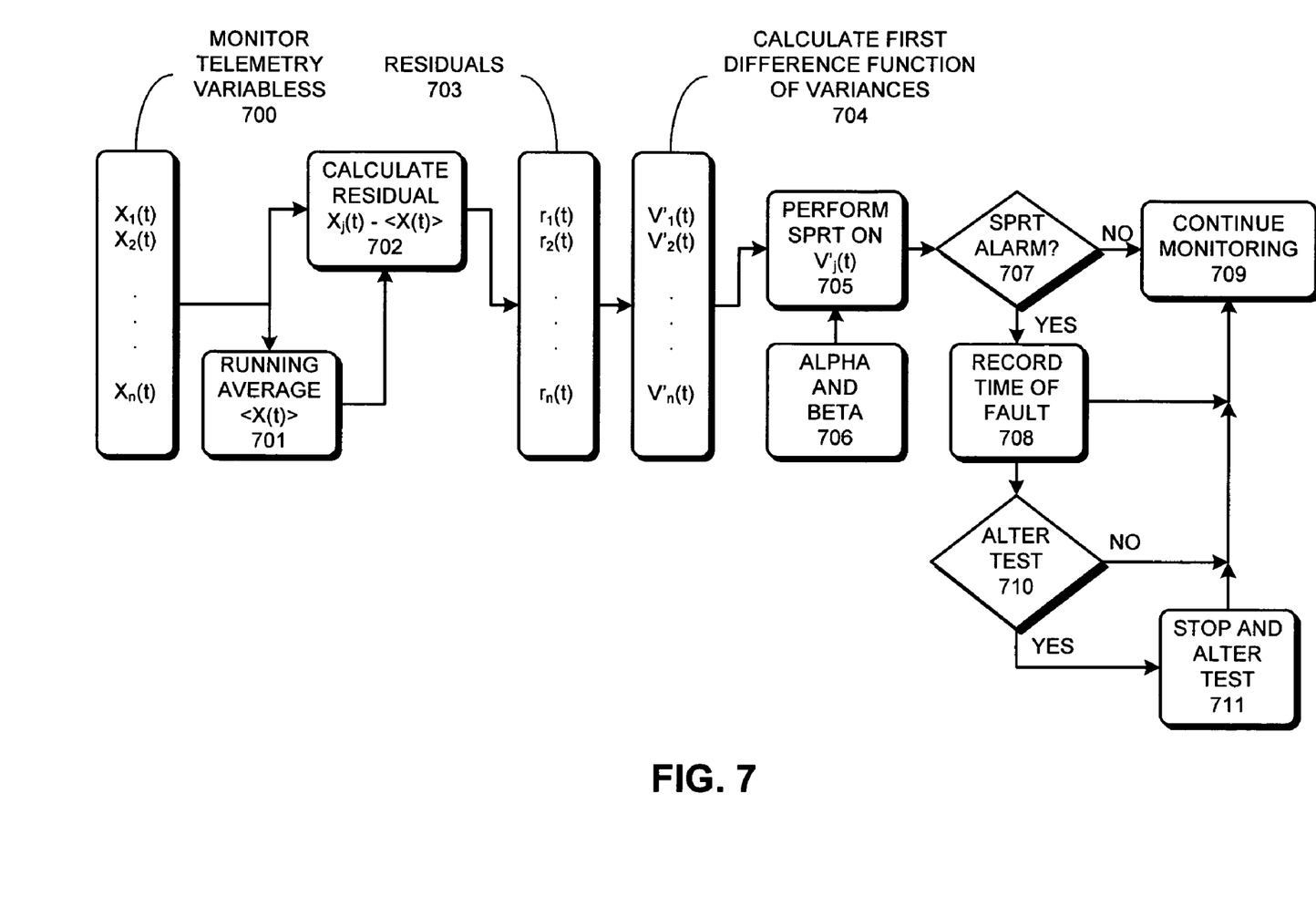
FIG. 7 presents a flow chart illustrating the process of using the first-difference function for the variance of telemetry variables to detect the onset of degradation in components during reliability-evaluation studies in accordance with an embodiment of the present invention.

FIG. 7 presents a flow chart illustrating the process of using the first-difference function for the variance of telemetry variables to detect the onset of degradation in components during reliability-evaluation studies in accordance with an embodiment of the present invention. The process begins when the system monitors telemetry variables (step 700). In one embodiment of the present invention, the telemetry variable is a variance function of the monitored telemetry variable. In another embodiment of the present invention, the system receives a time series for the monitored telemetry variable and calculates a variance function of the time series for the monitored telemetry variable. Note that FIG. 5 and FIG. 7 are different. FIG. 5 illustrates the process of monitoring a number of distinct telemetry variables for a single computer system or a single component. In contrast, FIG. 7 illustrates the process of monitoring a single telemetry variable from a number of specimens of a component. In one embodiment of the present invention, the process illustrated in FIG. 7 can be performed on one or more telemetry variables across a number of specimens of a component.

Next, the system calculates a running average across all monitored telemetry variables (step 701). The system then calculates residuals for the telemetry variables (step 702) to produce residuals 703. In one embodiment of the present invention, the system calculates residuals for the telemetry variables by subtracting the running average for all monitored telemetry variable from each monitored telemetry variable.

Next, the system calculates the first-difference function for the residuals of the variance for the monitored telemetry variables (step 704). In one embodiment of the of the present invention, for each time point within the time series for the telemetry variable, the system calculates the first-difference function by subtracting a value of the time series at a previous time point from the value of the time series at a present time point. In one embodiment of the present invention, the system divides the result of the subtraction by the value of a length of a time interval between the previous time point and the present time point.

The system then performs a Sequential Probability Ratio Test (SPRT) on the first-difference functions (step 705). Note that the system receives alpha and beta values 706 for the SPRT. Note that SPRTs are described in more detail below.

If an alarm is generated by the SPRTs (step 707, yes), the system records the time of failure (step 708). The system then determines whether the reliability-evaluation study should be altered (step 710). If so, the system stops and alters the reliability-evaluation study (step 711). The system then continues monitoring the telemetry variables (step 709). If the system determines that the reliability-evaluation study should not be altered, the system continues monitoring the telemetry variables (step 709).

If no alarm is generated by the SPRTs (step 707, no), the system continues monitoring the telemetry variables (step 709).

SPRT (Sequential Probability Ratio Test)

The Sequential Probability Ratio Test is a statistical hypothesis test that differs from standard fixed sample tests. In fixed-sample statistical tests, a given number of observations are used to select one hypothesis from one or more alternative hypotheses. The SPRT, however, examines one observation at a time, and then makes a decision as soon as it has sufficient information to ensure that pre-specified confidence bounds are met.

The basic approach taken by the SPRT technique is to analyze successive observations of a discrete process. Let $y_n$ represent a sample from the process at a given moment $t_n$ in time. In one embodiment of the present invention, the sequence of values $\{Y_n\}=y_0, y_1, \ldots, y_n$ comes from a stationary process characterized by a Gaussian, white-noise probability density function (PDF) with mean 0. (Note that since with the sequence is from a nominally stationary processes, any process variables with a nonzero mean can be first normalized to a mean of zero with no loss of generality).

The SPRT is a binary hypothesis test that analyzes process observations sequentially to determine whether or not the telemetry variable is consistent with normal behavior. When a SPRT reaches a decision about current process behavior (i.e., the telemetry variable is behaving normally or abnormally), the system reports the decision and continues to process observations.

For each of the eight types of tandem SPRT tests described below, the telemetry variable data adheres to a Gaussian PDF with mean 0 and variance $\sigma^2$ for normal signal behavior, referred to as the null hypothesis, $H_0$. The system computes eight specific SPRT hypothesis tests in parallel for each telemetry variable monitored. One embodiment of the present invention applies a SPRT to an electrical current time-series. Other embodiments of the present invention apply a SPRT to other telemetry variables, including voltage, internal temperature, or stress variables.

The SPRT surveillance module executes all 8 tandem hypothesis tests in parallel. Each test determines whether the current sequence of process observations is consistent with the null hypothesis versus an alternative hypothesis. The first four tests are: (SPRT 1) the positive-mean test, (SPRT 2) the negative-mean test, (SPRT 3) the nominal-variance test, and (SPRT 4) the inverse-variance test. For the positive-mean test, the telemetry variable data for the corresponding alternative hypothesis, $H_1$, adheres to a Gaussian PDF with mean +M and variance $\sigma^2$. For the negative-mean test, the telemetry variable data for the corresponding alternative hypothesis, $H_2$, adheres to a Gaussian PDF with mean −M and variance $\sigma^2$. For the nominal-variance test, the telemetry variable data for the corresponding alternative hypothesis, $H_3$, adheres to a Gaussian PDF with mean 0 and variance $V\sigma^2$ (with scalar factor V). For the inverse-variance test, the telemetry variable data for the corresponding alternative hypothesis, $H_4$, adheres to a Gaussian PDF with mean 0 and variance $\sigma^2/V$.

The next two tandem SPRT tests are performed not on the raw telemetry variables as above, but on the first difference function of the telemetry variable. For discrete time series, the first-difference function (i.e., difference between each observation and the observation preceding it) gives an estimate of the numerical derivative of the time series. During uninteresting time periods, the observations in the first-difference function are a nominally stationary random process centered about zero. If an upward or downward trend suddenly appears in the telemetry variable, SPRTs number 5 and 6 observe an increase or decrease, respectively, in the slope of the telemetry variable.

For example, if there is a decrease in the value of the telemetry variable, SPRT alarms are triggered for SPRTs 2 and 6. SPRT 2 generates a warning because the sequence of raw observations drops with time. And SPRT 6 generates a warning because the slope of the telemetry variable changes from zero to something less than zero. The advantage of monitoring the mean SPRT and slope SPRT in tandem is that the system correlates the SPRT readings from the eight tests and determines if the component has failed. For example, if the telemetry variable levels off to a new stationary value (or plateau), the alarms from SPRT 6 cease because the slope returns to zero when the raw telemetry variable reaches a plateau. However, SPRT 2 will continue generating a warning because the new mean value of the telemetry variable is different from the value prior to the degradation. Therefore, the system correctly identifies that the component has failed.

If SPRTs 3 or 4 generates a warning, the variance of the telemetry variable is either increasing or decreasing, respectively. An increasing variance that is not accompanied by a change in mean (inferred from SPRTs 1 and 2 and SPRTs 5 and 6) signifies an episodic event that is "bursty" or "spiky" with time. A decreasing variance that is not accompanied by a change in mean is a common symptom of a failing component that is characterized by an increasing time constant.

Therefore, having variance SPRTs available in parallel with slope and mean SPRTs provides a wealth of supplementary diagnostic information.

The final two tandem SPRT tests, SPRT 7 and SPRT 8, are performed on the first-difference function of the variance estimates for the telemetry variable. The first-difference function of the variance estimates is a numerical approximation of the derivative of the sequence of variance estimates. As such, SPRT 7 triggers a warning flag if the variance of the telemetry variable is increasing, while SPRT 8 triggers a warning flag if the variance of the telemetry variable is decreasing. A comparison of SPRT alarms from SPRTs 3, 4, 7, and 8, gives a great deal of diagnostic information on a class of failure modes known collectively as a "change-in-gain without a change-in-mean." For example, if SPRTs 3 and 7 both trigger warning flags, it is an indication that there has been a sudden increase in the variance of the process. If SPRT 3 continues to trigger warning flags but SPRT 7 ceases issuing warning flags, it is an indication that the degradation mode responsible for the increased noisiness has gone to completion. Such information can be beneficial in root causing the origin of the degradation and eliminating it from future product designs.

Similarly, if SPRTs 4 and 8 both start triggering alarms, there is a decrease in variance for the process. If SPRT 4 continues to issue warning flags but SPRT 8 ceases issuing warning flags, it is an indication that the degradation mode has gone to completion. In safety-critical processes, this failure mode (decreasing variance without a change in mean) is dangerous in conventional systems that are monitored only by threshold limit tests. The reason it is dangerous is that a shrinking variance, when it occurs as a result of a transducer that is losing its ability to respond, never trips a threshold limit. (In contrast degradation that manifests as a linear decalibration bias, or even an increasing variance, eventually trips a high or low threshold limit and sounds a warning). A sustained decreasing variance, which happens, for example, when oil-filled pressure transmitters leak their oil, or electrolytic capacitors leak their electrolyte, never trips a threshold in conventional systems, but will be readily detected by the suite of 8 tandem SPRT tests taught in this invention.

The SPRT technique provides a quantitative framework that permits a decision to be made between the null hypothesis and the eight alternative hypotheses with specified misidentification probabilities. If the SPRT accepts one of the alternative hypotheses, an alarm flag is set and data is transmitted.

The SPRT operates as follows. At each time step in a calculation, the system calculates a test index and compares it to two stopping boundaries A and B (defined below). The test index is equal to the natural log of a likelihood ratio ($L_n$), which for a given SPRT is the ratio of the probability that the alternative hypothesis for the test ($H_j$, where j is the appropriate subscript for the SPRT in question) is true, to the probability that the null hypothesis ($H_0$) is true.

$$L_n = \frac{\text{probability of observed sequence} \{Y_n\} \text{ given } H_j \text{ is true}}{\text{probability of observed sequence} \{Y_n\} \text{ given } H_0 \text{ is true}} \quad (1)$$

If the logarithm of the likelihood ratio is greater than or equal to the logarithm of the upper threshold limit [i.e., $\ln(L_n) > \ln(B)$], then the alternative hypothesis is true. If the logarithm of the likelihood ratio is less than or equal to the logarithm of the lower threshold limit [i.e., $\ln(L_n) < \ln(A)$], then the null hypothesis is true. If the log likelihood ratio falls between the two limits, [i.e., $\ln(A) < \ln(L_n) < \ln(B)$], then there is not enough information to make a decision (and, incidentally, no other statistical test could yet reach a decision with the same given Type I and II misidentification probabilities).

Equation (2) relates the threshold limits to the misidentification probabilities $\alpha$ and $\beta$:

$$A = \frac{\beta}{1-\alpha}, \quad B = \frac{1-\beta}{\alpha} \quad (2)$$

where $\alpha$ is the probability of accepting $H_j$ when $H_0$ is true (i.e., the false-alarm probability), and $\beta$ is the probability of accepting $H_0$ when $H_j$ is true (i.e., the missed-alarm probability).

The first two SPRT tests for normal distributions examine the mean of the process observations. If the distribution of observations exhibits a non-zero mean (e.g., a mean of either +M or −M, where M is the pre-assigned system disturbance magnitude for the mean test), the mean tests determine that the system is degraded. Assuming that the sequence $\{Y_n\}$ adheres to a Gaussian PDF, then the probability that the null hypothesis $H_0$ is true (i.e., mean 0 and variance $\sigma^2$) is:

$$P(y_1, y_2, \ldots, y_n | H_0) = \frac{1}{(2\pi\sigma^2)^{n/2}} \exp\left[-\frac{1}{2\sigma^2}\sum_{k=1}^{n} y_k^2\right] \quad (3)$$

Similarly, the probability for alternative hypothesis $H_1$ is true (i.e., mean M and variance $\sigma^2$) is:

$$P(y_1, y_2, \ldots, y_n | H_1) = \quad (4)$$
$$\frac{1}{(2\pi\sigma^2)^{n/2}} \exp\left[-\frac{1}{2\sigma^2}\left(\sum_{k=1}^{n} y_k^2 - 2\sum_{k=1}^{n} y_k M + \sum_{k=1}^{n} M^2\right)\right]$$

The ratio of the probabilities in (3) and (4) gives the likelihood ratio $L_n$ for the positive-mean test:

$$L_n = \exp\left[-\frac{1}{2\sigma^2}\sum_{k=1}^{n} M(M - 2y_k)\right] \quad (5)$$

Taking the logarithm of likelihood ratio given by (5) produces the SPRT index for the positive-mean test ($SPRT_{pos}$):

$$SPRT_{pos} = -\frac{1}{2\sigma^2}\sum_{k=1}^{n} M(M - 2y_k) = \frac{M}{\sigma^2}\sum_{k=1}^{n}\left(y_k - \frac{M}{2}\right) \quad (6)$$

The SPRT index for the negative-mean test ($SPRT_{neg}$) is derived by substituting −M for each instance of M in (4) through (6) above, resulting in:

$$SPRT_{neg} = \frac{M}{\sigma^2}\sum_{k=1}^{n}\left(-y_k - \frac{M}{2}\right) \quad (7)$$

The next two SPRT tests examine the variance of the sequence. This capability gives the SPRT module the ability to detect and quantitatively characterize changes in variability for processes, which is vitally important for 6-sigma QA/QC improvement initiatives. In the variance tests, the system is degraded if the sequence exhibits a change in variance by a factor of V or 1/V, where V, the pre-assigned system disturbance magnitude for the variance test, is a positive scalar. The probability that the alternative hypothesis $H_3$ is true (i.e., mean 0 and variance $V\sigma^2$) is given by (3) with $\sigma^2$ replaced by $V\sigma^2$:

$$P(y_1, y_2, \ldots, y_n \mid H_0) = \frac{1}{(2\pi V \sigma^2)^{n/2}} \exp\left[-\frac{1}{2V\sigma^2} \sum_{k=1}^{n} y_k^2\right] \quad (8)$$

The likelihood ratio for the variance test is given by the ratio of (8) to (3):

$$L_n = V^{-n/2} \exp\left[-\frac{1}{2\sigma^2} \frac{1-V}{V} \sum_{k=1}^{n} y_k^2\right] \quad (9)$$

Taking the logarithm of the likelihood ratio given in (9) produces the SPRT index for the nominal-variance test ($SPRT_{nom}$):

$$SPRT_{nom} = \frac{1}{2\sigma^2}\left(\frac{V-1}{V}\right)\sum_{k=1}^{n} y_k^2 - \frac{n}{2}\ln V \quad (10)$$

The SPRT index for the inverse-variance test ($SPRT_{inv}$) is derived by substituting 1/V for each instance of V in (8) through (10), resulting in:

$$SPRT_{inv} = \frac{1}{2\sigma^2}(1-V)\sum_{k=1}^{n} y_k^2 + \frac{n}{2}\ln V \quad (11)$$

The tandem SPRT module performs mean, variance, and SPRT tests on the raw process telemetry variable and on its first difference function. To initialize the module for analysis of a telemetry variable time-series, the user specifies the system disturbance magnitudes for the tests (M and V), the false-alarm probability ($\alpha$), and the missed-alarm probability ($\beta$).

Then, during the training phase (before the first failure of a component under test), the module calculates the mean and variance of the monitored variable process signal. For most telemetry variables the mean of the raw observations for the telemetry variable will be nonzero; in this case the mean calculated from the training phase is used to normalize the telemetry variable during the monitoring phase. The system disturbance magnitude for the mean tests specifies the number of standard deviations (or fractions thereof) that the distribution must shift in the positive or negative direction to trigger an alarm. The system disturbance magnitude for the variance tests specifies the fractional change of the variance necessary to trigger an alarm.

At the beginning of the monitoring phase, the system sets all eight SPRT indices to 0. Then, during each time step of the calculation, the system updates the SPRT indices using (6), (7), (10), and (11). The system compares each SPRT index is then compared to the upper [i.e., $\ln((1-\beta)/\alpha]$ and lower [i.e., $\ln((\beta/(1-\alpha))]$ decision boundaries, with these three possible outcomes:

1. the lower limit is reached, in which case the process is declared healthy, the test statistic is reset to zero, and sampling continues;
2. the upper limit is reached, in which case the process is declared degraded, an alarm flag is raised indicating a sensor or process fault, the test statistic is reset to zero, and sampling continues; or
3. neither limit has been reached, in which case no decision concerning the process can yet be made, and the sampling continues.

The advantages of using a SPRT are twofold:
1. early detection of very subtle anomalies in noisy process variables; and
2. pre-specification of quantitative false-alarm and missed-alarm probabilities.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for monitoring the health of a computer system, comprising:
   receiving a variance of a time series for a monitored telemetry variable within the computer system,
   calculating a residual function of the variance of the time series for the monitored telemetry variable;
   calculating a first-difference function of the variance of the time series from the residual function;
   determining whether the first-difference function indicates that the computer system is at the onset of degradation; and
   if so, performing a remedial action.

2. The method of claim 1, wherein prior to receiving the variance for the time series for the monitored telemetry variable, the method further comprises:
   receiving the time series for the monitored telemetry variable; and
   calculating the variance of the time series for the monitored telemetry variable.

3. The method of claim 1, wherein calculating the first-difference function of the time series involves, for each time point within the time series, subtracting a value of the time series at a previous time point from the value of the time series at a present time point.

4. The method of claim 3, further comprises dividing the result of the subtraction by the value of a length of a time interval between the previous time point and the present time point.

5. The method of claim 1, wherein calculating the residual function for a time series involves:
   for each time interval in the time series,
      calculating a running average of values for the time series up to and including a present time interval; and
      subtracting the running average from a value of the time series at the present time interval.

6. The method of claim 1, wherein determining whether the first-difference function indicates that the computer system is at the onset of degradation involves determining whether the first-difference function exceeds a specified threshold.

7. The method of claim 1, wherein determining whether the first-difference function indicates that the computer system is at the onset of degradation involves:
   performing a Sequential Probability Ratio Test (SPRT) on the first-difference function; and
   determining whether the SPRT generates an alarm.

8. The method of claim 7, wherein the SPRT can include one or more of:
   a positive variance first-difference test, which generates an alarm if the first-difference function for the variance of the time series for the monitored telemetry variable is increasing; and
   a negative variance first-difference test, which generates an alarm if the first-difference function for the variance of the time series for the monitored telemetry variable is decreasing.

9. The method of claim 1, wherein performing the remedial action can involve performing one or more of:
   recording a time when the onset of degradation occurred;
   notifying a system administrator that the computer system is at the onset of degradation;
   shutting down the computer system;
   backing up data stored on the computer system;
   failing-over to a redundant computer system; and
   replacing one or more components which are at the onset of degradation.

10. A computer-readable storage medium storing instructions that when executed by a computer cause the computer to perform a method for monitoring the health of a computer system, wherein the method comprises:
    receiving a variance of a time series for a monitored telemetry variable within the computer system;
    calculating a residual function of the variance of the time series for the monitored telemetry variable;
    calculating a first-difference function of the variance of the time series from the residual function;
    determining whether the first-difference function indicates that the computer system is at the onset of degradation; and
    if so, performing a remedial action.

11. The computer-readable storage medium of claim 10, prior to receiving the variance for the time series for the monitored telemetry variable, the method further comprises:
    receiving the time series for the monitored telemetry variable; and
    calculating the variance of the time series for the monitored telemetry variable.

12. The computer-readable storage medium of claim 10, wherein calculating the first-difference function of the time series involves, for each time point within the time series, subtracting a value of the time series at a previous time point from the value of the time series at a present time point.

13. The computer-readable storage medium of claim 12, wherein the method further comprises dividing the result of the subtraction by the value of a length of a time interval between the previous time point and the present time point.

14. The computer-readable storage medium of claim 10, wherein calculating the residual function for a time series involves:
    for each time interval in the time series,
       calculating a running average of values for the time series up to and including a present time interval; and
       subtracting the running average from a value of the time series at the present time interval.

15. The computer-readable storage medium of claim 10, wherein determining whether the first-difference function indicates that the computer system is at the onset of degradation involves determining whether the first-difference function exceeds a specified threshold.

16. The computer-readable storage medium of claim 10, wherein determining whether the first-difference function indicates that the computer system is at the onset of degradation involves:
    performing a Sequential Probability Ratio Test (SPRT) on the first-difference function; and
    determining whether the SPRT generates an alarm.

17. The computer-readable storage medium of claim 16, wherein the SPRT can include one or more of:
    a positive variance first-difference test, which generates an alarm if the first-difference function for the variance of the time series for the monitored telemetry variable is increasing; and
    a negative variance first-difference test, which generates an alarm if the first-difference function for the variance of the time series for the monitored telemetry variable is decreasing.

18. The computer-readable storage medium of claim 10, wherein performing the remedial action can involve performing one or more of:
    recording a time when the onset of degradation occurred;
    notifying a system administrator that the computer system is at the onset of degradation;
    shutting down the computer system;
    backing up data stored on the computer system;
    failing-over to a redundant computer system; and
    replacing one or more components which are at the onset of degradation.

19. An apparatus that monitors the health of a computer system, comprising:
    a receiving mechanism configured to receive a variance of a time series for a monitored telemetry variable within the computer system,
    a residual-calculation mechanism configured to calculate a residual function of the variance of the time series for the monitored telemetry variable;
    a difference-calculation mechanism configured to calculate a first-difference function of the variance of the time series from the residual function;
    a degradation-detection mechanism configured to determine whether the first-difference function indicates that the computer system is at the onset of degradation; and
    a remedial-action mechanism, wherein if the degradation-detection mechanism determines that the computer system is at the onset of degradation, the remedial-action mechanism is configured to perform a remedial action.

* * * * *